Figure 1:
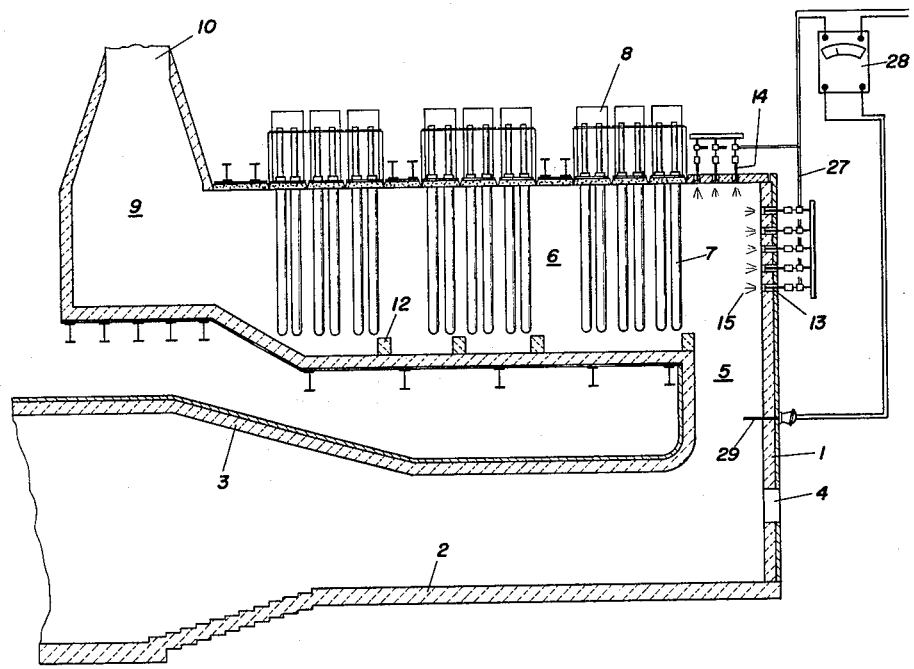

Nov. 17, 1964   J. D. KELLER   3,157,228
APPARATUS FOR COOLING METAL RECUPERATOR GASES
Filed Sept. 1, 1961

INVENTOR.
John D. Keller
BY William B Jaspert
Attorney.

United States Patent Office 3,157,228
Patented Nov. 17, 1964

3,157,228
APPARATUS FOR COOLING METAL
RECUPERATOR GASES
John D. Keller, Pittsburgh, Pa., assignor to Hazen Engineering Company, Pittsburgh, Pa., a corporation of Pennsylvania
Filed Sept. 1, 1961, Ser. No. 135,630
2 Claims. (Cl. 165—39)

This invention relates to new and useful improvements in recuperator structures, more particularly metallic recuperators, and it is among the objects thereof to provide means for preventing the burning out of the metal tubes or other metallic heat transferring elements.

In metallic recuperators employed to reclaim heat from the waste gases of industrial heating furnaces and provide preheated air for combustion in such furnaces, the waste gases entering the recuperator chamber in which the metal tubes are suspended are at very high temperatures, frequently in excess of the temperature which the metal tubes, which are stainless steel, can withstand without being damaged or burned out. To overcome this, cooling air has been added to the hot gases entering the recuperator chamber to lower the temperature of the gases. When such dilution air is admitted or injected into the waste gases, the oxygen of this air combines with the unburnt combustibles in the gases producing secondary combustion which is not completed by the time the diluted gases strike the recuperator tubes, but on the contrary is accelerated by the turbulence produced by the flow in or around the tubes. This has, in some cases, actually raised the temperature of the gases due to this secondary combustion, depending on the amount of combustible in the gases, the amount of air admitted and the degree of turbulence. But even if the gas temperature is lowered, the attack on metal tubes is much increased. When combustion occurs in actual contact with the metal surfaces or even in proximity thereto, the nascent oxygen atoms of the products of combustion are just as prone to seize on the iron of the metal tubes as to unite with the combustible gases. This greatly accelerated rate of attack when combustion occurs on metal surfaces is confirmed by observation over many years in actual experience and by laboratory tests.

In accordance with the present invention, the diluting medium used for lowering the temperature of the gases is water, which is injected into the gases on their way from the furnace in which they are generated, to the recuperator, the water being injected in the form of a fog by an extremely fine spray or series of sprays. Water does not support combustion, but instead it tends to blanket or quench any secondary combustion that might otherwise occur. Water is very effective for reducing the temperature of the waste gases, one pound of water absorbing about 1000 thermal units when vaporized. Hence a much smaller weight of water than of air, less than 25% for a typical case, is required to drop the gas temperature to the desired extent. Also although the water expands to steam, the increase of total volume to be handled by the stack is much less than when air is used as a diluent.

Figure 2:
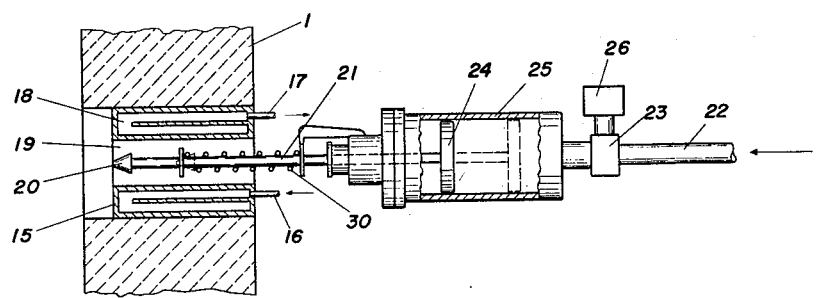

The invention will become more apparent from a consideration of the accompanying drawing in which like reference characters designate like parts and in which:

FIGURE 1 is a vertical section of an industrial furnace such as the charging end of a continuous heating furnace with a recuperator chamber disposed above the furnace chamber; and FIGURE 2 is an enlarged view of a sprayer nozzle and the manner of mounting the same in a water cooled sleeve in a furnace wall.

In the drawings, the numeral 1 designates an end wall of a continuous heating furnace having a hearth 2, a roof 3, a charging opening 4, a gas outlet passage 5 terminating in a recuperator chamber 6 through which the gas flows between a series of suspended stainless steel tubes 7, rows of which are arranged in banks suspended from header boxes 8, as shown. The hot gases passing from the outlet 5 through the recuperator chamber 6 exit at the passage 9 to the stack passage 10.

Disposed below the rows of tubes 7 are baffles 12 which prevent stratification of the hot gases at the bottom of the recuperator chamber.

In accordance with the present invention, a plurality of spray nozzles 13 are mounted in the end wall 1 adjacent the recuperator chamber and a plurality of similar nozzles 14 are disposed through the roof of the uptake, in front of the recuperator, the nozzles functioning to emit a fog-like spray into the passage 5 and to disperse the water droplets through the hot waste gases flowing therethrough to the recuperator chamber 6.

The spray structure generally designated by the numeral 13, is more clearly shown in FIGURE 2, in which the wall 1 is provided with a water cooled sleeve 15 having inlet and outlet pipes 16 and 17, respectively, for the flow of water that passes through the chambers 18 inside the sleeve. The sleeves 15 are provided with a central bore 19 into which extends the spray nozzle 20 connected by a pipe 21 extending to the source of water through a pipe connection 22. A valve 23 is provided in the water line 22 to initiate or shut off the flow of water to the nozzle 20.

The nozzles usually operate at a water pressure of from 20 to 150 pounds per square inch and for a furnace discharging 50,000 cubic feet of waste gases per minute, about 320 gallons of water per minute would be required to cool the gases to reduce the temperature of the gases by 300° F. If the nozzles are mounted on the sides or end of the uptake, as on the wall 1, about 16 nozzles could be used, and if mounted on the roof of the uptake and discharging downward, such as the nozzles 14, a smaller number of nozzles of larger size could be employed. Because of the heat to which the nozzles are exposed, they can be retracted by means of a piston 24 and cylinder 25 and these pistons and cylinders could be operated by a common control, not shown. The water supply valves 23 are provided with solenoids 26 having a common connection by conductors 27 with a temperature controller 28 having a thermocouple 29 in the recuperator chamber. This thermocouple preferably has its junction in contact with the metal of the tubes first struck by the entering gases, as 5a in FIGURE 1. Alternatively, it may measure the temperature of the gases entering the recuperator. When the temperature to which the metal tubes are exposed, as measured by the thermocouple 29, exceeds a set limit of safety, controller 28 opens valves 23 to start the spraying and when the temperature drops to a safe value, the valves are automatically shut off.

Since the openings of the spray nozzles are necessarily small, clean water must be used to prevent clogging. As shown in FIGURE 2, the spray nozzles are normally in retracted position and so held by a coil spring 30, but when the water is supplied through the control valves 23, the pressure on the pistons 24 advances the nozzles through the opening 19 to the correct position for spraying into the path of the hot gases.

Although one embodiment of the invention has been herein illusrated and described, it will be evident to those skilled in the art that various modifications may be made in the details of construction without departing from the principles herein set forth.

I claim:
1. In an industrial heating furnace, a recuperator chamber, a gas flow passage connecting the furnace chamber with said recuperator chamber, a plurality of metal tubes disposed in said recuperator chamber and spray nozzles mounted along the path of travel of the gases from said furnace chamber to the recuperator chamber for spraying water drops into the hot gases to lower the temperature thereof, said spray nozzles being provided with water flow control valves connected to be operated by a temperature controller in response to temperature conditions existing in the path of travel of the gases from the furnace and apparatus for automatically retracting the spray nozzles away from the path of the hot gases when the water flow is shut off.

2. Apparatus as set forth in claim 1 in which the spray nozzles are mounted in openings in the furnace wall in which they are mechanically retractable and through which they advance by means of the water pressure supplied to said nozzles.

References Cited by the Examiner
UNITED STATES PATENTS

| | | | |
|---|---|---|---|
| 1,797,256 | 3/31 | Boardman | 165—39 |
| 2,670,945 | 3/54 | Hazen | 263—20 X |
| 2,841,383 | 7/58 | Hazen | 263—20 |
| 2,850,325 | 9/58 | Suess | 239—587 |
| 2,947,522 | 8/60 | Keller | 165—39 X |

CHARLES SUKALO, *Primary Examiner.*

HARRY B. THORNTON, PERCY L. PATRICK,
*Examiners.*